(12) United States Patent
Koike et al.

(10) Patent No.: US 7,538,545 B2
(45) Date of Patent: May 26, 2009

(54) COMBINED SENSOR AND BEARING ASSEMBLY

(75) Inventors: Takashi Koike, Iwata (JP); Tomomi Ishikawa, Iwata (JP); Hiroshi Isobe, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/074,064

(22) Filed: Feb. 29, 2008

(65) Prior Publication Data
US 2008/0157759 A1    Jul. 3, 2008

Related U.S. Application Data

(62) Division of application No. 11/072,437, filed on Mar. 7, 2005.

(30) Foreign Application Priority Data

Mar. 8, 2004 (JP) ............... 2004-063303

(51) Int. Cl.
*G01B 7/30* (2006.01)
*F16C 32/00* (2006.01)

(52) U.S. Cl. ................. 324/207.25; 384/448

(58) Field of Classification Search ......... 324/207.25, 324/207.2, 173–174, 160, 166, 163; 73/514.31, 73/514.39; 384/446, 448, 484; 335/229, 335/284, 296, 302–306
See application file for complete search history.

(56) References Cited

U.S. PATENT DOCUMENTS 5,097,355 A * 3/1992 Eden ............... 359/213
5,722,777 A 3/1998 Ouchi
5,779,368 A * 7/1998 Morita et al. ........... 384/448
6,043,576 A 3/2000 Weber et al.
6,273,230 B1 8/2001 Nakano et al.
6,741,073 B2 * 5/2004 Iwamoto et al. ......... 324/174
2002/0030482 A1 3/2002 Iwamoto et al.
2004/0196027 A1 10/2004 Iwamoto et al.

FOREIGN PATENT DOCUMENTS

DE    197 04 472 A1    8/1998
DE    101 35 784 A1    2/2002
GB    2 155 565 A    9/1985
JP    9-329614    12/1997

OTHER PUBLICATIONS

Takaoka Shuji, et al., "Patent Abstracts of Japan", Publication No. 9-329614, Publication Date Dec. 22, 1997.

* cited by examiner

*Primary Examiner*—Reena Aurora

(57) ABSTRACT

A combined sensor and bearing assembly including a rolling bearing unit and a rotation sensor unit. The rolling bearing unit is made up of a rotatable raceway member, a stationary raceway member and at least one row of rolling elements. The rotation sensor unit includes a to-be-detected member having a magnet and fitted to one of the raceway members, and a magnetic detecting member fitted to the other raceway member at a location confronting the to-be-detected member. This combined sensor and bearing assembly is used at a location close to an electromagnetic coil emanating a leakage magnetic field, in a condition in which a direction of flow of an electric current through the electromagnetic coil is fixed in one direction so that a direction of a magnetic flux, with which the magnetic detecting member is switched off, may coincide with a direction of the leakage magnetic flux.

1 Claim, 7 Drawing Sheets

Hall IC OFF
                                Hall IC ON

One Complete Rotation

Hall IC OFF
                                Hall IC ON

COMBINED SENSOR AND BEARING ASSEMBLY

CROSS-REFERENCE TO RELATED APPLICATIONS

This application is a divisional of application Ser. No. 11/072,437 filed Mar. 7, 2005 and claims the benefit of Japanese Application No. 2004-063303, filed Mar. 8, 2004, in the Japanese Intellectual Property Office, the disclosures of which are incorporated herein by reference.

BACKGROUND OF THE INVENTION

1. Field of the Invention

The present invention relates to a combined sensor and bearing assembly for detecting the revolution of a rotating element used in various machines and equipments, of a type having a point-of-origin signal detecting capability that enables the detection of, for example, the rotational speed of a rotary shaft.

2. Description of the Related Art

The combined sensor and bearing assembly capable of detecting the rotational speed of one of inner and outer raceway members relative to the other thereof is currently available in various types, one of which is disclosed in, for example, the Japanese Laid-open Patent Publication No. 9-329614. However, it has been found that the rotation sensor employed in those conventional combined sensor and bearing assemblies is complicated in structure and, therefore, attempts have been suggested to provide the combined sensor and bearing assembly capable of detecting the revolution through the detection of the point of origin, which will now be discussed.

By way of example, the combined sensor and bearing assembly is suggested, in which a magnetic encoder having only a single magnetic polarity, for example, S-pole or only three magnetic polarities of N-, S- and N-poles at maximum in succession is mounted on the bearing inner race, which is a rotatable raceway member, and, on the other hand, a single magnetic sensor is mounted on the bearing outer race, which is a stationary raceway member, in face-to-face relation with the magnetic encoder. See, for example, the Japanese Patent Application No. 2003-147511. According to this suggestion, the detection of the point of origin (Z-phase) is possible and the rotational speed of the rotatable raceway member can also be detected.

The combined sensor and bearing assembly of the structure now suggested is featured in compactness, elimination of the required adjustment in assemblage and robustness and is generally used for supporting, for example, a machine drive motor.

Also, the magnetic encoder for the detection of the point of origin can be obtained by securing a magnet, which has only one magnetic polarity, to a side surface of a sealing member. In such case, this sealing member is concurrently used in the magnetic encoder and, therefore, the structure can advantageously be simplified.

However, when the combined sensor and bearing assembly having the capability of detecting the point-of-origin signal of the structure discussed above is used in the vicinity of members such as, for example, an electric drive motor and an electromagnetic clutch tending to generate a magnetic field, for detecting the rotational speed of a rotary shaft, an Hall IC element forming the magnetic sensor may be kept on under the influence of a leakage magnetic flux at all times during activation of the electromagnetic clutch, resulting in incapability of detecting the rotational.

SUMMARY OF THE INVENTION

In view of the foregoing, the present invention is intended to provide an improved combined sensor and bearing assembly, which is so structured as to avoid the influence brought about by the leakage magnetic flux so that the point of origin can be accurately detected even in the environment full of the leakage magnetic flux and without being adversely affected by the leakage magnetic flux.

In order to accomplish the foregoing object of the present invention, one aspect of the present invention provides a combined sensor and bearing assembly having a capability of detecting a point of origin, which assembly includes a rolling bearing unit made up of a rotatable raceway member, a stationary raceway member and at least one row of rolling elements rollingly interposed between the rotatable and stationary raceway members, and a rotation sensor unit including a to-be-detected member having a magnet fitted to one of the rotatable and stationary raceway members; and a magnetic detecting member fitted to the other of the rotatable and stationary raceway members at a location confronting the to-be-detected member. This combined sensor and bearing assembly is used at a location close to an electric coil emanating a leakage magnetic field, in a condition in which a direction of flow of an electric current through the coil is fixed in one direction so that a direction of a magnetic flux, with which the magnetic detecting member is switched off, may coincide with a direction of the leakage magnetic flux.

According to this aspect of the present invention, the magnetic detecting member can be switched off by the leakage magnetic field, but can necessarily be switched on when the to-be-detected member is brought in face-to-face relation with the magnetic detecting member. As such, even under the environment full of the leakage magnetic flux, the point of origin can be accurately detected without being adversely affected by the leakage magnetic flux.

The combined sensor and bearing assembly according to another aspect of the present invention, which is also provided herein, is featured in that the combined sensor and bearing assembly is used at a location close to an electric coil emanating a leakage magnetic field, in such a manner that a direction of detection of a magnetic field by the magnetic detecting member crosses a direction of the leakage magnetic flux inputted to the magnetic detecting member.

According to this different aspect of the present invention, since the combined sensor and bearing assembly is used in such a manner that a direction of detection of a magnetic field by the magnetic detecting member crosses a direction of the leakage magnetic flux inputted to the magnetic detecting member, the point of origin can be accurately detected without being adversely affected by the leakage magnetic flux.

In such case, the direction of detection of the magnetic field by the magnetic detecting member and the direction of the leakage magnetic flux inputted to the magnetic detecting member may cross to each other at an angle of substantially 90°. Selection of this particular angle for the crossing is effective to substantially eliminate the influence brought about by the leakage magnetic flux on the magnetic detecting member and, therefore, a further accurate detection of the point of origin is possible.

In a preferred embodiment, the to-be-detected member may be a radial type and the direction of detection of the magnetic flux by the magnetic detecting member may correspondingly be a radial direction. According to this feature, when the combined sensor and bearing assembly of the present invention is used in, for example, a rotary support for an electromagnetic clutch, and considering that the leakage magnetic flux from the electromagnetic clutch develops in a direction axially of the bearing unit, the direction in which the magnetic detecting member detects the magnetic field can easily be set to cross the direction of the leakage magnetic flux.

In another preferred embodiment of the present invention, the rolling bearing unit may also include a sealing member having a reinforcement ring made of a magnetic member, in which case a non-magnetic material portion including the magnetic detecting member is mounted on a generally L-sectioned ring member made of a magnetic material, with a radially extending portion of the ring member positioned close to and in parallel to the reinforcement ring of the sealing member.

According to this feature, since the leakage magnetic flux flows in the L-sectioned ring member after having bypassed, the magnetic leakage field can easily flow in a radial direction between the rotatable raceway member and the stationary raceway member and, therefore, the leakage magnetic flux in the radial direction that is inputted to the magnetic detecting member can advantageously be reduced. For this reason, it is possible to avoid the influence which may be brought by the leakage magnetic flux on the magnetic detecting member, allowing an accurate detection of the point of origin to be achieved.

In a further preferred embodiment, the rolling bearing unit may also include a sealing member having a reinforcement ring made of a magnetic material and further comprising a bypass ring made of a magnetic material positioned close to the reinforcement ring for reducing a magnetic resistance between the rotatable and stationary raceway members. The use of the bypass ring made of the magnetic material is effective to reduce the magnetic resistance between the rotatable raceway member and the stationary raceway member, allowing the leakage magnetic flux to concentrate on the bypass ring. For this reason, it is possible to accomplish the detection of the point of origin without the magnetic detecting member being adversely affected by the leakage magnetic flux.

The bypass ring referred to above may have a portion of its circumference depleted to provide a cutout to thereby render the bypass ring to represent a generally U-shape. In this case, the to-be-detected member and the magnetic detecting member are arranged within the cutout. This is particularly advantageous in that the to-be-detected member and the magnetic detecting member can be positioned at the same axial position in alignment with each other and, therefore, the rotation sensor unit can be assembled compact.

In a still further preferred embodiment of the present invention, the magnetic detecting member may have a magnetic detecting sensitivity so low that the leakage magnetic flux in the vicinity of the magnetic detecting member can not be detected. According to this feature, the influence which would be brought about by the leakage magnetic flux on the magnetic detecting member can be minimized by the magnetic detecting sensitivity so that the magnetic detecting member can be switched on only when the to-be-detected member is brought in face-to-face relation with the magnetic detecting member. Also, in such case, regardless of the relation between the direction of magnetic detection by the magnetic detecting member and the direction of the leakage magnetic flux, the influence brought about by the leakage magnetic flux on the magnetic detecting member can advantageously be minimized.

In accordance with a further aspect of the present invention, there is provided a combined sensor and bearing assembly having a capability of detecting a point of origin of the structure described above in connection with the first and second mentioned aspects of the present invention, which is featured in that the combined sensor and bearing assembly is used at a location close to an electric coil emanating a leakage magnetic field and in that the magnet of the to-be-detected member is made up of an N-pole magnet and an S-pole magnet.

According to this further aspect of the present invention, during the relative revolution of the rotatable and stationary raceway members, the magnetic detecting member detects the N-pole magnet of the to-be-detected member to output a detected rotation signal in the form of a single train of pulses and also detects the S-pole magnet thereof to a detected rotation signal in the form of another train of pulses. In such case, even in a condition in which the magnetic detecting member is kept switched on by the leakage magnetic flux, depending on the direction of the leakage magnetic flux, a period during which the magnetic detecting member is switched off occurs when one of the N-pole and S-pole is in position confronting the magnetic detecting member. Accordingly, even under the environment full of the leakage magnetic flux, the detection of the point of origin and the concomitant detection of the revolution can be achieved.

BRIEF DESCRIPTION OF THE DRAWINGS

The present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Figure 1:
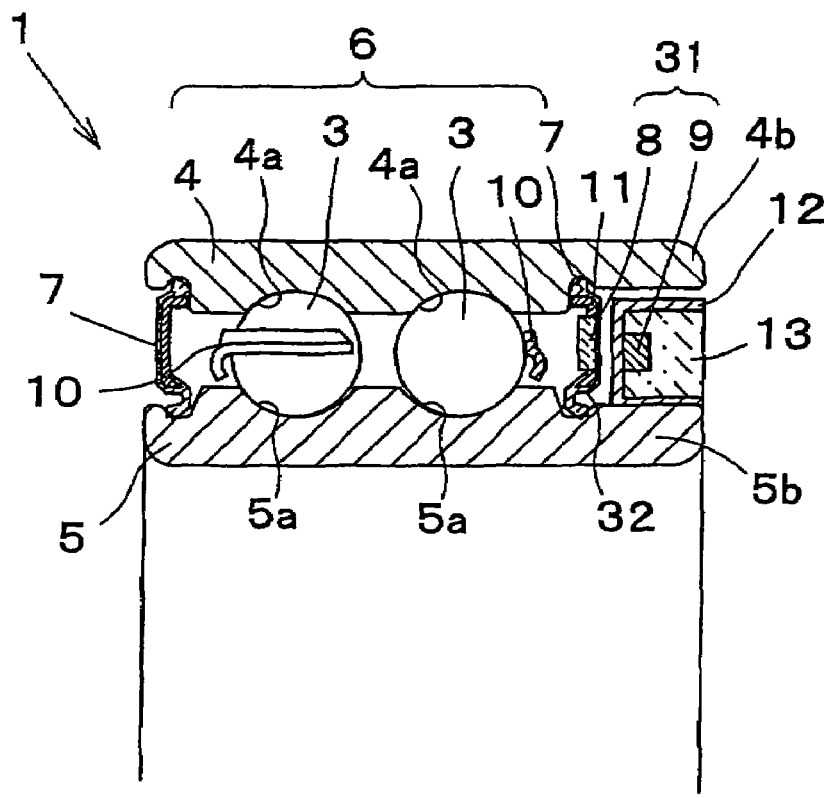
FIG. 1 is a fragmentary longitudinal sectional view of a combined sensor and bearing assembly according to a first preferred embodiment of the present invention.
Figure 2:
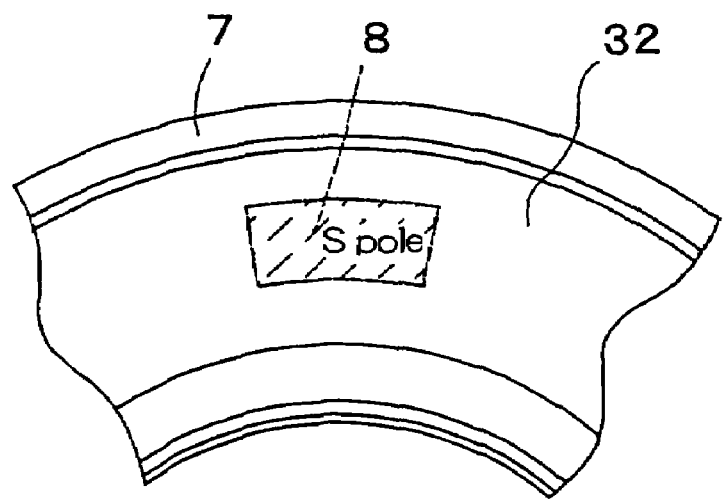
FIG. 2 is a fragmentary end view, on an enlarged scale, of the combined sensor and bearing assembly, showing a portion of a sealing member employed therein.
Figure 3:
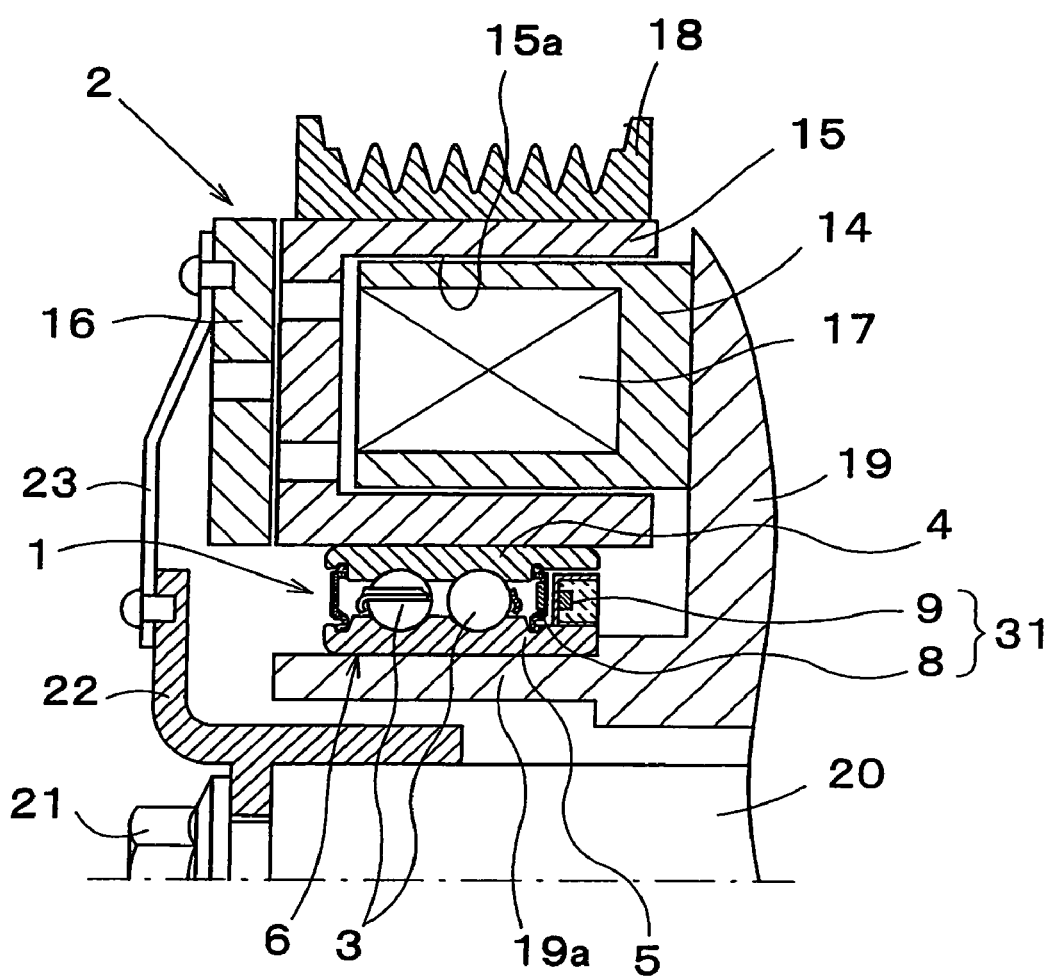
FIG. 3 is a fragmentary longitudinal sectional view an electromagnetic clutch employing the combined sensor and bearing assembly according to the present invention.

In the first place, reference is made to FIGS. 1 to 5 for the detailed description of a combined sensor and bearing assembly 1 according to a first preferred embodiment of the present invention. In particular, FIGS. 1 and 2 illustrates the details of the combined sensor and bearing assembly 1 and FIG. 3 illustrates an electromagnetic clutch 3 employing the combined sensor and bearing assembly 1.

As best shown in FIGS. 1 and 2, the combined sensor and bearing assembly 1 includes a rolling bearing unit 6 made up of a rotatable raceway member 4, a stationary raceway member 5 and two rows of rolling elements 3 operatively retained by respective roller retainers 10 and rollingly interposed between the rotatable raceway member 4 and the stationary raceway member 5 in a manner well known to those skilled in the art, and a rotation sensor unit 31. The rotatable raceway member 4 has an inner peripheral surface formed with inner raceway grooves 4a and the stationary raceway member 5 has an outer peripheral surface formed with outer raceway grooves 5a, wherefore the rows of the rolling elements 3 are received in part within the inner raceway grooves 4a and in part within the outer raceway grooves 5a. An annular bearing space delimited between the rotatable raceway member 4 and the stationary raceway member 5 has its opposite open ends sealed off by respective annular sealing members 7.

In the illustrated embodiment, the rolling bearing unit 6 referred to above is in the form of, for example, a dual row deep groove ball bearing having inner and outer races, which represent the stationary and rotatable raceway members 5 and 4, respectively. Hence, so far shown therein, the outer race of the dual row deep groove ball bearing is rotatable relative to the inner race thereof.

The rotation sensor unit 31 includes a to-be-detected member 8 secured to the rotatable raceway member 4 and a magnetic detecting member 9 secured to the stationary raceway member 5 at a location aligned with the to-be-detected member 8 in a direction axially of the rolling bearing unit 6. In the instance as shown, the to-be-detected member 8 and the magnetic detecting member 9 altogether form the rotation sensor unit 31 of an axial type, in which the to-be-detected member 8 and the magnetic detecting member 9 confront with each other in a direction axially of the bearing assembly 1.

The to-be-detected member 8 is so magnetized axially that only when the to-be-detected member 8 is brought into the proximity of the magnetic detecting member 9, the latter can be switched on. More specifically, as best shown in FIG. 2 in a fragmentary end view, the to-be-detected member 8 is in the form of a column-shaped or sheet-like magnet magnetized to one of the annular sealing members 7 that is positioned adjacent the magnetic detecting member 9 (which sealing member is hereinafter referred to as the right sealing member). This to-be-detected member 8 has one of its opposite surfaces confronting the magnetic detecting member 9, which is magnetized to only one polarity, i.e., S-pole or a maximum number of three alternating polarities, i.e., N-, S- and N-poles deployed successively in a direction circumferentially of the right sealing member 7. Securement of the magnet forming the to-be-detected member 8 to the right sealing member 7 may be carried out either by bonding the magnet to a reinforcement ring 11 of the right sealing member 7, or by embedding the magnet through an insert molding technique when a rubber member 32 is bonded by vulcanization to the reinforcement ring 11.

With the to-be-detected member 8 so structured as hereinabove described, when the S-pole approaches the magnetic detecting member 9, the latter outputs a point-of-origin signal. It is, however, to be noted that where the magnetic detecting member 9 has a characteristic reverse to that described above, the magnetic polarity of the to-be-detected member 8 must be correspondingly reverse to that described above. As a magnet forming the to-be-detected member 8, for example, a rubber magnet, plastic magnet or sintered magnet can be conveniently employed. Also, as a magnetic material for the magnet, ferrite, Nd or SmCo material can be suitably employed.

The magnetic detecting member 9 referred to above is in the form of a magnetic sensor such as, for example, a Hall element, Hall IC or MR sensor and is embedded in a annular sensor housing 12 of a generally U-shaped section. More specifically, the magnetic detecting member 9 can be embedded in the sensor housing 12 by means of a molding process, in which after the magnetic detecting member 9 has been inserted into the sensor housing 12 together with an electric connecting cable (not shown) a resin molding 13 is formed inside the sensor housing 12.

The sensor housing 12 may be made of either a synthetic resin or a non-magnetic metallic material and is fixedly mounted on the stationary raceway member 5. More specifically, this sensor housing 12 with the magnetic detecting member 9 embedded therein is press-fitted onto an outer peripheral surface of a tubular extension 5b that is integral with and extends axially outwardly from one of opposite ends of the stationary raceway member 5 adjacent the right sealing member 7, i.e., the right end of the stationary raceway member 5 so far shown in FIG. 1. It is, however, to be noted that in such case the electric connecting cable may be dispensed with and, instead, interfacing between the magnetic detecting member 9 and an external circuit element, including the supply of an electric power from the external circuit element to the magnetic detecting member 9 and transmission of signals between the external circuit element and the magnetic detecting member 9, may be carried out on a non-contact basis (i.e., wireless).

In the combined sensor and bearing assembly 1 of the structure described above, the rotation sensor unit 31 provides a point-of-origin signal in the form of a single pulse from the magnetic detecting member 9 each time the rotatable raceway member 4 undergoes one complete rotation about the longitudinal axis of the bearing assembly 1. With this point-of-origin signal, the number of revolutions and the rotational speed of the rotatable raceway member 4 can be detected and, therefore, the combined sensor and bearing assembly 1 can be used at any site from which the status of rotation is desired to be detected for the purpose of, for example, detecting a locked condition of a rotary shaft.

FIG. 3 illustrates the use of the combined sensor and bearing assembly 1 in a rotary support of the electromagnetic clutch 2. In the instance as shown therein, the electromagnetic clutch 2 is of a kind used to control the mechanical coupling and decoupling in a drive system for a compressor incorporated in an automobile air conditioning system. The illustrated electromagnetic clutch 2 includes an annular stator 14, an annular rotor 15 and an annular clutch plate 16. The rotor 15 is rotatably mounted on and supported by an annular axial protrusion 19a through the combined sensor and bearing assembly 1, which protrusion 19a is formed integrally with or otherwise connected rigidly with a compressor housing 19 so as to extend in a direction axially of the bearing assembly 1. The rotatable raceway member 4, which is the outer race of the combined sensor and bearing assembly 1, is inserted into a bore of the rotor 15 of the electromagnetic clutch 2 and is rigidly secured thereto for rotation together with the rotor 15.

On the other hand, the stationary raceway member 5, which is the inner race of the combined sensor and bearing assembly 1, is fixedly mounted on the annular axial protrusion 19a fast with the compressor housing 19.

A pulley 18 is press-fitted onto an outer periphery of the rotor 15 for rotation together therewith and is drivingly coupled with an automotive engine (not shown) through a substantially endless drive belt so that revolution of the automotive engine can be transmitted to the pulley 18 and, hence, to the rotor 15. This rotor 15 is of a generally U-sectioned annular configuration having a circumferentially extending inner groove 15a. The stator 14 has an electromagnetic coil 17 built therein and is fixed to the compressor housing 19 so as to protrude loosely into the inner groove 15a of the rotor 15. Positioned inside the annular axial protrusion 19a fast with the compressor housing 19 is a rotary shaft 20 of the compressor having a generally L-sectioned flange member 22 rigidly secured thereto by means of a bolt 21. The annular clutch plate 16 referred to hereinbefore and made of a magnetic material is coupled with, and positioned radially outwardly of, the flange member 22 through a spring plate 23.

The clutch plate 16 is arranged in face-to-face relation with the rotor 15 and, accordingly, when the electromagnetic clutch 2 is electrically activated (i.e., powered on), an electric current flow through the electromagnetic coil 17 with an electromagnetic force of attraction generated consequently from the electromagnetic coil 17. Because of this electromagnetic force of attraction, the clutch plate 16 is magnetically attracted by the rotor 15 and, therefore, rotation of the rotor 15 caused by the automotive engine through the drive belt by way of the pulley 18 can be transmitted to the rotary shaft 20 of the compressor to thereby drive the compressor. So long as the electromagnetic clutch 2 is deactivated (i.e., powered off), no rotation of the rotor 15 will not be transmitted to the rotary shaft 20 since the clutch plate 16 is separated from the rotor 15.

Figure 4:
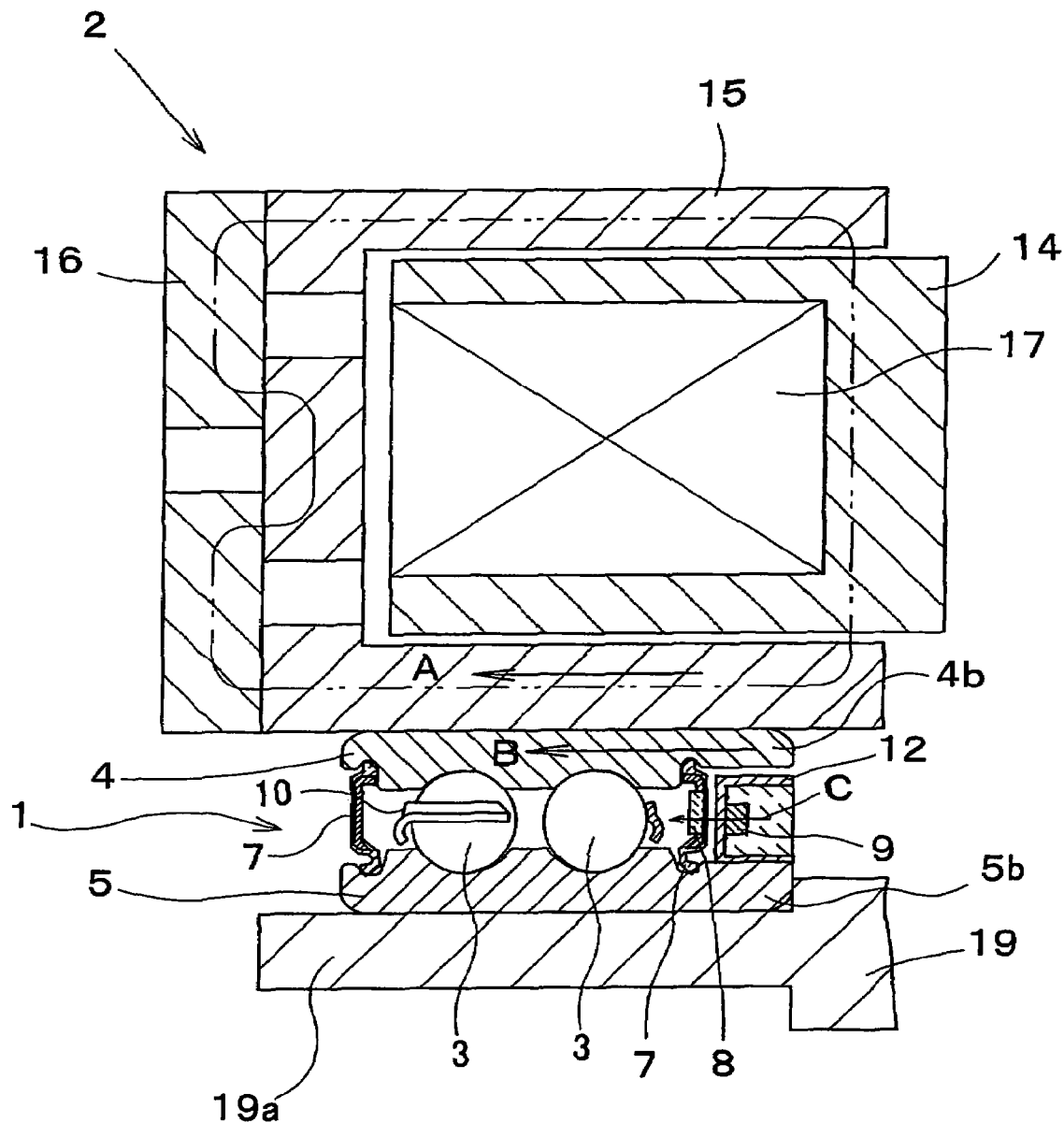
FIG. 4 is a fragmentary longitudinal sectional view, on an enlarged scale, of the electromagnetic clutch, showing an exemplary passage of a leakage magnetic flux towards the combined sensor and bearing assembly.
Figure 5:
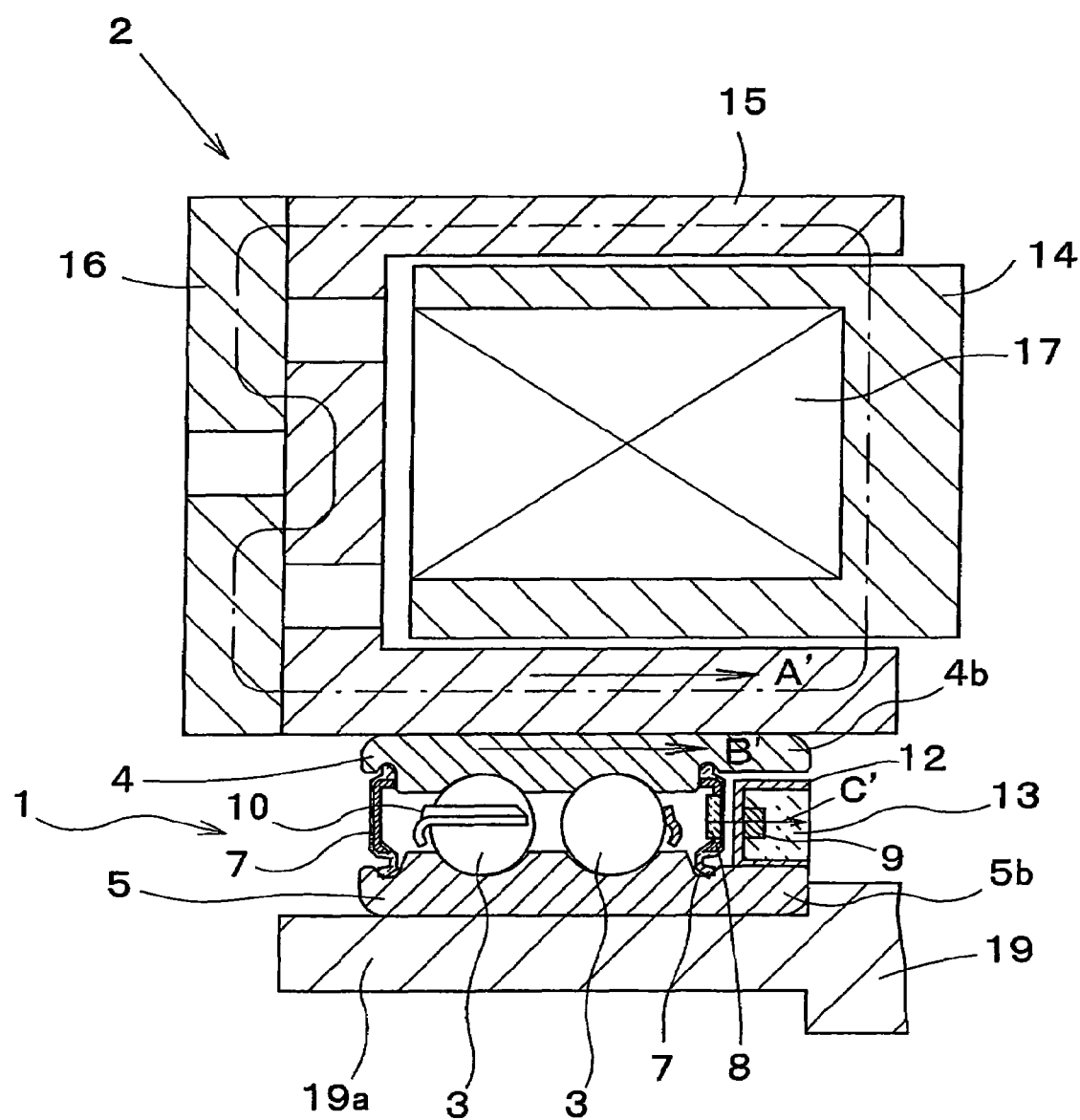
FIG. 5 is a fragmentary longitudinal sectional view, on an enlarged scale, of the electromagnetic clutch, showing an actual passage of a leakage magnetic flux towards the combined sensor and bearing assembly.

FIG. 4 illustrates the condition of the electromagnetic clutch 2 when the latter is activated. As shown therein, upon activation of the electromagnetic clutch 2, a magnetic circuit as shown by the double dotted line can be formed. At this time, a leakage magnetic flux flows towards the combined sensor and bearing assembly. The direction of orientation of the magnetic circuit formed within the stator 14 and the rotor 15 of the electromagnetic clutch 2 varies depending on the direction of flow of the electric current through the electromagnetic coil 17 accommodated within the stator 14. By way of example, assuming that the magnetic circuit extends in a direction shown by the arrow A in FIG. 4, a magnetic circuit B oriented in the same direction as shown by the arrow A is also formed in the rotatable raceway member 4 of the combined sensor and bearing assembly 1. Accordingly, if a Hall IC of a switching type is employed for the magnetic detecting member 9 and, on the other hand, the leakage magnetic flux of an intensity higher than the sensitivity of the Hall IC flows in a direction shown by the arrow C, the magnetic detecting member 9 can be switched on. In such case, since the magnetic detecting member 9 is kept switched on and is not switched off even though the to-be-detected member 8 does not confront the magnetic detecting member 9, the point of origin cannot be detected.

In view of the above, in the illustrated embodiment, in order to render the direction of the magnetic flux, with which the magnetic detecting member 9 is switched off, to coincide with the direction of the leakage magnetic flux, the electric current is supplied to the electromagnetic coil 17 so as to flow in a direction reverse to that discussed above as shown in FIG. 5. Accordingly, the direction of orientation of the magnetic circuit formed within the stator 14 and the rotor 15 of the electromagnetic clutch 2 is such as shown by A' and the magnetic circuit B' in the same direction as that shown by A' is also formed within the rotatable raceway member 4. Also, the leakage magnetic flux flows into the magnetic detecting member 9 as well and this leakage magnetic flux is oriented in a direction C' which is in the substantially same direction as that shown by A'. In such case, the leakage magnetic flux flowing in the direction C' causes the Hall IC, forming the magnetic detecting member 9, to be switched off, but when the to-be-detected member 8 is brought to a position aligned with the magnetic detecting member 9, the Hall IC (that is, the magnetic detecting member 9) is necessarily switched on and, accordingly, the detection of the point of origin is possible. In other words, the rotation sensor unit 31 is capable of accomplishing the point-of-origin detection accurately without being adversely affected by the leakage magnetic flux even under the environment where the leakage magnetic flux exists.

Figure 6:
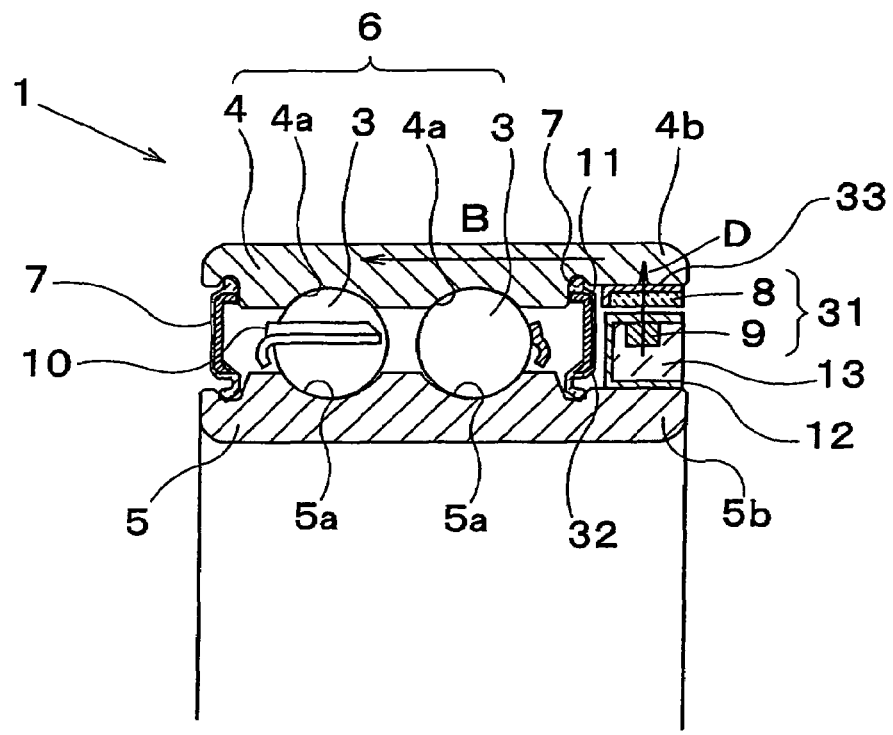
FIG. 6 is a fragmentary longitudinal sectional view of the combined sensor and bearing assembly according to a second preferred embodiment of the present invention.

FIG. 6 illustrates a second preferred embodiment of the present invention. The combined sensor and bearing assembly 1 shown therein makes use of the rotation sensor unit 31 of a radial type, in which the to-be-detected member 8 and the magnetic detecting member 9 confront with each other in a radial direction perpendicular to the longitudinal axis of the bearing assembly 1. In this embodiment, the to-be-detected member 8 of the rotation sensor unit 31 is in the form of a magnet magnetized in an inner peripheral surface of a ring-shaped core metal 33, which is in turn press-fitted into a bore of a tubular extension 4b that is integral with and extends axially outwardly from one of opposite ends, i.e., a right end, of the rotatable raceway member 4 adjacent the right sealing member 7. The magnet forming the to-be-detected member 8 is so magnetized in a radial direction.

On the other hand, the magnetic detecting member 9 is in the form of a magnetic sensor embedded in the annular sensor housing 12 of the generally U-shaped section as is the case with that in the embodiment shown in and described with reference to FIGS. 1 to 5, but is positioned in an outer peripheral portion of the sensor housing 12 so that the magnetic detecting member 9 can confronts the to-be-detected member 8 in a direction radially with respect to the longitudinal axis of the bearing assembly 1. Accordingly, the direction in which the magnetic detecting member 9 detects the magnetic field is oriented in a direction D radially of the combined sensor and bearing assembly 1.

The combined sensor and bearing assembly 1 according to this second embodiment can be equally employed in the electromagnetic clutch 2 shown in FIG. 3 in place of the combined sensor and bearing assembly 1 shown in FIG. 1. Other structural features of the combined sensor and bearing assembly 1 shown in FIG. 6 than those described above are substantially similar to those shown in and described with reference to FIGS. 1 to 5 and, therefore, the details thereof are not reiterated for the sake of brevity.

According to the second embodiment, while the magnetic circuit established within the rotatable raceway member 4 upon activation of the electromagnetic clutch 2 extends, for example, in a direction shown by the arrow B and the leakage magnetic flux leaking into the magnetic detecting member 9 flows in the same direction as that shown by the arrow B, the direction in which the magnetic detecting member 9 detects the magnetic field in this second embodiment is oriented in the radial direction D as hereinbefore described. For this reason, the direction of the leakage flux and the direction in which the magnetic detecting member 9 detects cross to each other at an angle of, for example, substantially 90°.

Accordingly, it is possible to accomplish an accurate detection of the point of origin without the magnetic detecting member 9 being adversely affected by the leakage magnetic flux. Since in the illustrated instance, the direction of the leakage magnetic flux and the direction in which the magnetic detecting member 9 detects is set to cross to each other at an angle of substantially 90°, it is possible to substantially eliminate the influence which the leakage magnetic flux may bring on the magnetic detecting member 9, allowing the rotation sensor unit 31 to accomplish an accurate detection of the point of origin.

Also, with this embodiment, similar effects can be obtained regardless of the direction in which the electric current flows through the electromagnetic coil 17 of the electromagnetic clutch 2. In addition, since the rotation sensor unit 31 is so designed and so tailored as to be the radial type as hereinbefore described, it is quite easy to set the direction, in which the magnetic detecting member 9 detects the magnetic field, to cross relative to the direction of the leakage magnetic flux emanating from the electromagnetic clutch 2.

Figure 7:
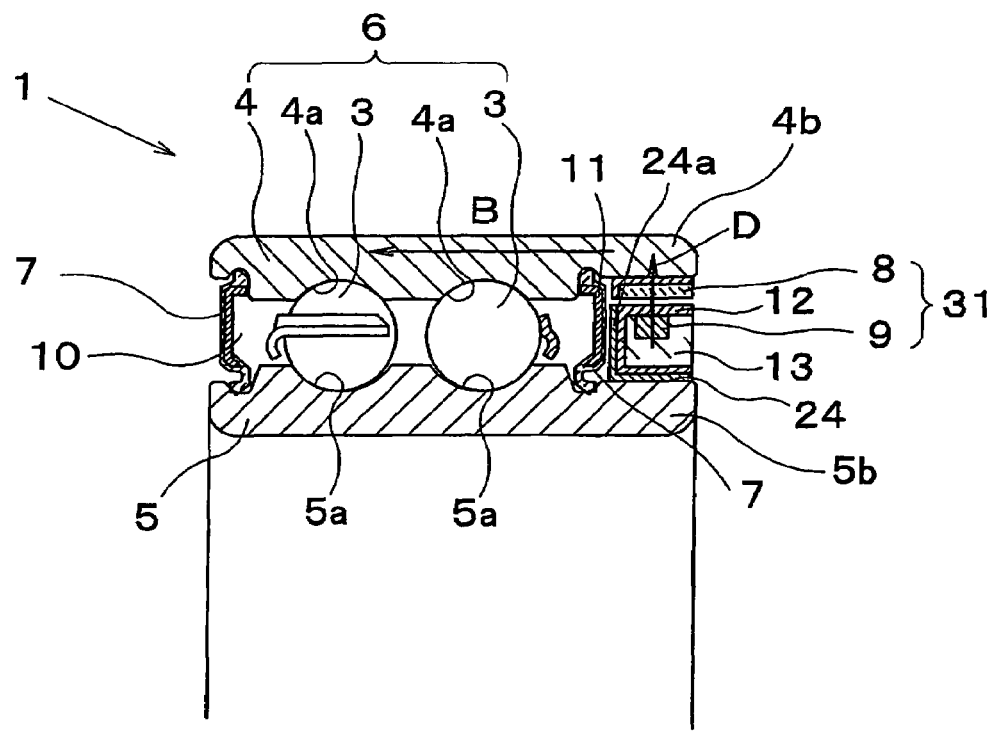
FIGS. 7 to 10 are fragmentary longitudinal sectional views of the combined sensor and bearing assembly according to third to sixth preferred embodiments of the present invention, respectively.

Referring now to FIG. 7 showing a third preferred embodiment of the present invention, the combined sensor and bearing assembly 1 shown therein is substantially similar to that shown in and described in connection with the previous embodiment with reference to FIG. 6, except that in accordance with this third embodiment the sensor housing 12 made of a non-magnetic material and having the magnetic detecting member 9 embedded therein as hereinbefore described is fixedly mounted on the tubular extension 5b through a generally L-sectioned ring member 24 made of a magnetic material. Specifically, this L-sectioned ring member 24 is press fitted onto the outer peripheral surface of the tubular extension 5b from the stationary raceway member 5 to allow the magnetic detecting member 9 to be set by the stationary raceway member 5 through such ring member 24. This ring member 24 has a cylindrical body, press-fitted to the tubular extension 5b, and a radial wall 24a extending radially outwardly from an inner end of the cylindrical body and, in an assembled condition as shown, the radial wall 24a is held in the vicinity of the right sealing member 7 so as to extend parallel to the reinforcement ring 11 of the right sealing member 7. The reinforcement ring 11 is made of a magnetic material.

Other structural features of the combined sensor and bearing assembly 1 shown in FIG. 7 than those described above are substantially similar to those shown in and described with reference to FIG. 6 and, therefore, the details thereof are not reiterated for the sake of brevity.

According to the third embodiment, since the leakage magnetic flux flows in the L-sectioned ring member 24 after having bypassed, the leakage magnetic field can easily flow in a radial direction between the rotatable raceway member 4 and the stationary raceway member 5 and, therefore, the leakage magnetic flux D in the radial direction that is inputted to the magnetic detecting member 9 can advantageously be reduced. For this reason, it is possible to avoid an erroneous operation which would otherwise occur as a result of influences brought about by the leakage magnetic flux on the magnetic detecting member 9, allowing an accurate detection of the point of origin to be achieved.

Figure 8:
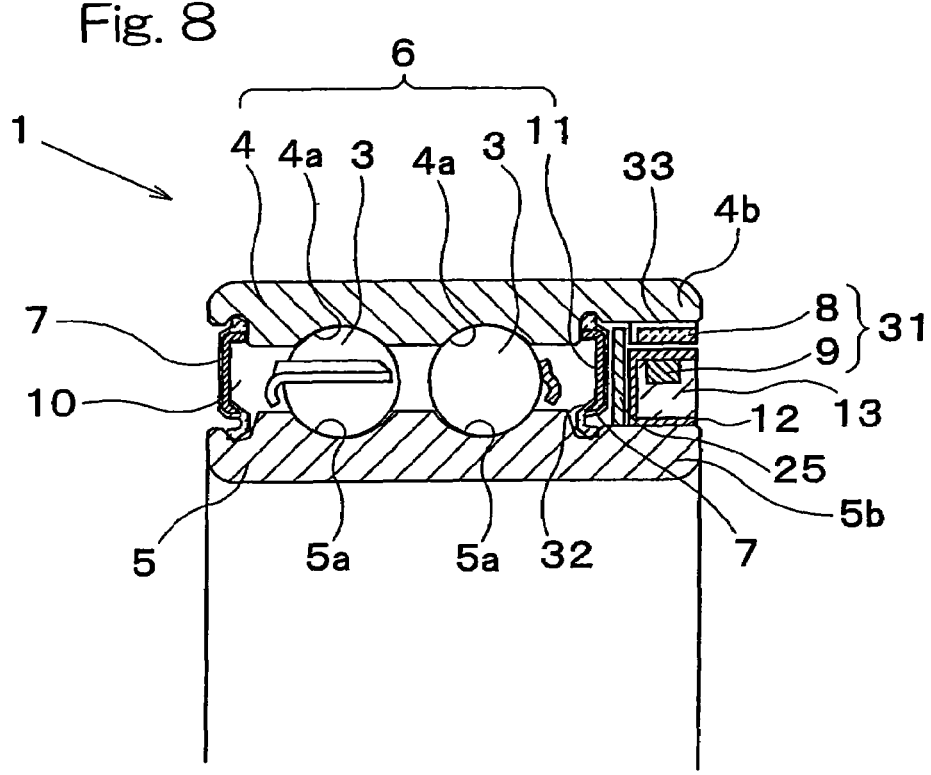

FIG. 8 illustrates a fourth preferred embodiment of the present invention. The combined sensor and bearing assembly 1 according to this fourth embodiment is substantially similar to that shown in and described in connection with the previous embodiment with reference to FIG. 7, except that in place of the L-sectioned ring member 24 used in the previous embodiment, a bypass ring 25 made of a magnetic material is interposed between the right sealing member 7 and the sensor housing 12. In this embodiment, the bypass ring 25 is press-fitted onto the outer peripheral surface of the tubular extension 5b of the stationary raceway member 5 so as to assume a position in the vicinity of the reinforcement ring 11 of the right sealing member 7 and made of a magnetic material.

According to the fourth embodiment, the magnetic resistance between the rotatable raceway member 4 and the stationary raceway member 5 can be reduced by the bypass ring 25, allowing the leakage flux to be concentrated on the bypass member 25. For this reason, the magnetic flux leaking around the magnetic detecting member 9 can be reduced and, hence, the accurate detection of the point of origin can advantageously be accomplished without the magnetic detecting member 9 being adversely affected by the leakage magnetic flux.

Figure 9:
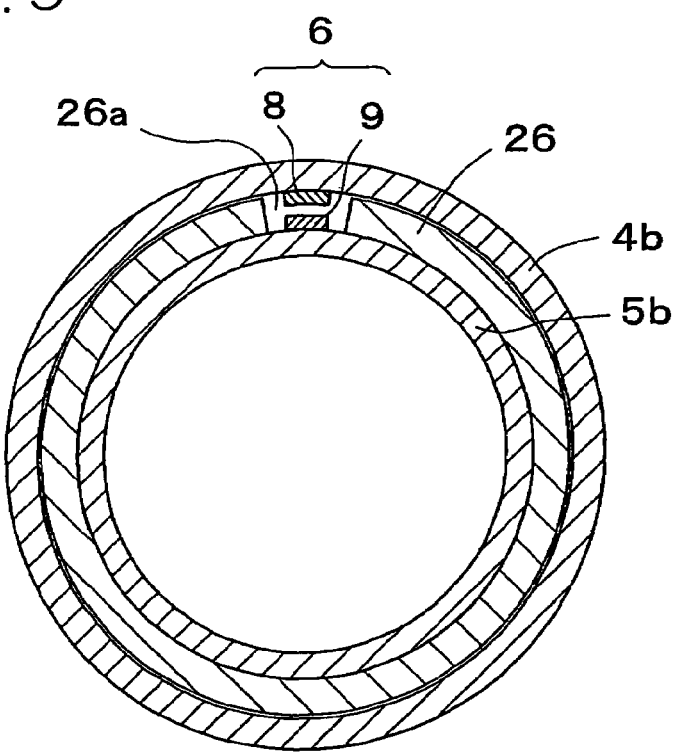

A fifth preferred embodiment of the present invention will now be described with particular reference to FIG. 9. The combined sensor and bearing assembly 1 shown in FIG. 9 is substantially similar to that shown in and described in connection with the previous embodiment with reference to FIG. 8, except that in place of the bypass ring 25 employed in the embodiment of FIG. 8, a generally U-shaped bypass ring 26 formed by splitting an O-ring to have a cutout 26a is employed. This generally U-shaped bypass ring 26 is press-fitted on the tubular extension 5b of the stationary raceway member 5 with the to-be-detected member 8 and the magnetic detecting member 9 positioned within the cutout 26a.

In this fifth embodiment, the to-be-detected member 8 in the form of a magnet is fitted directly to the inner peripheral surface of the tubular extension 4b of the rotatable raceway member 4 with no core metal 33 of FIG. 8 employed. Similarly, the magnetic detecting member 9 is fitted directly to the outer peripheral surface of the tubular extension 5b of the stationary raceway member 5 with no sensor housing 12 of FIG. 8 employed. In such case, the bypass ring 26 is disposed at an axial position aligned with any one of the to-be-detected member 8 and the magnetic detecting member 9, but alternatively such bypass ring 26 may be disposed at an axial position displaced from the magnetic detecting member 9 as is the case with that in the embodiment shown in and described with reference to FIG. 8. Accordingly, so far as the axial position of the bypass ring 26 is concerned, the bypass ring 26 can have a relatively large freedom of disposition.

It is, however, to be noted that even the bypass ring 26 is positioned in the vicinity of the reinforcement ring 7 of the right sealing member 11 as is the case with that in the embodiment of FIG. 8 and that the rolling bearing 6 employed in the embodiment of FIG. 9 is substantially similar to that shown in and described with reference to FIG. 8.

Even in the combined sensor and bearing assembly 1 according to the fifth embodiment shown in and described with reference to FIG. 9, the bypass ring 26 made of a magnetic material contributes to reduction of the magnetic resistance between the rotatable raceway member 4 and the stationary raceway member 5 to allow the leakage magnetic flux to be concentrated on the bypass ring 26 and, therefore, it is possible to accomplish an accurate detection of the point of origin without the magnetic detecting member 9 being adversely affected by the leakage magnetic flux. In such case, since the bypass ring 26 can be arranged at the axial position in alignment with the magnetic detecting member 9, the rotation sensor unit 31 can be assembled compact in size.

Figure 10:
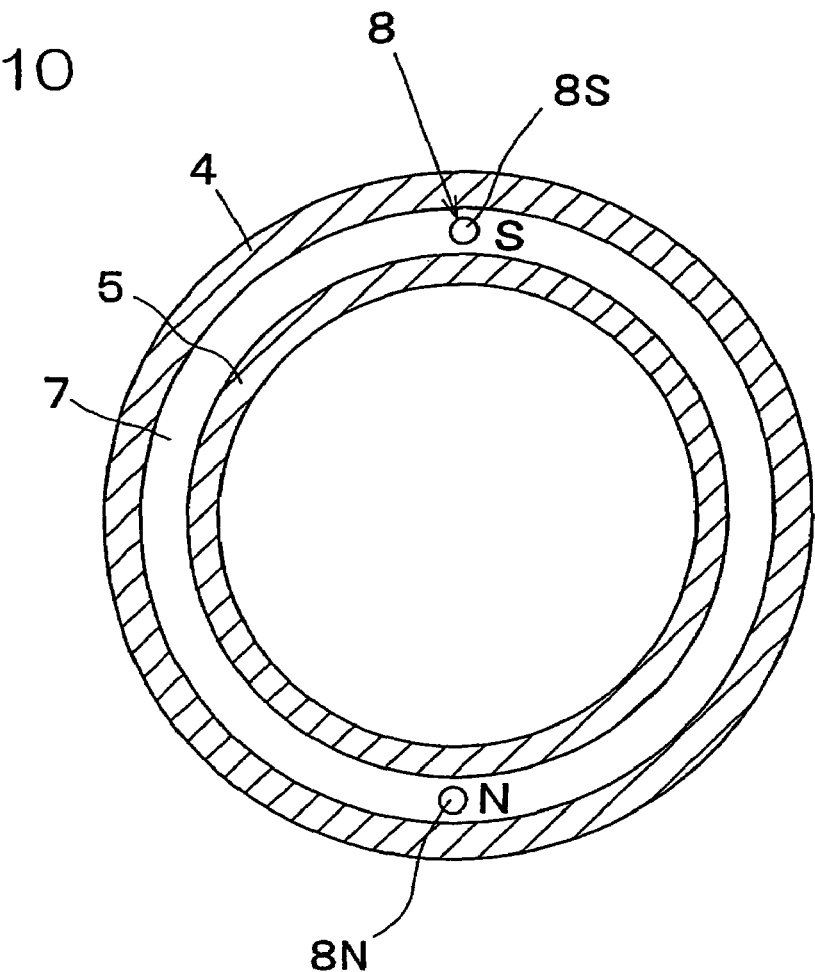
Figure 11A:
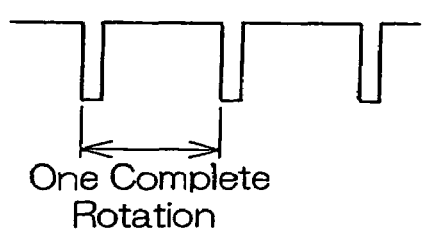
FIGS. 11A and 11B illustrate pulse wave forms of a magnetic detecting member.
Figure 11B:

With particular reference to FIGS. 10 and 11, the combined sensor and bearing assembly 1 according to a sixth preferred embodiment of the present invention will now be described. This combined sensor and bearing assembly 1 is substantially similar to that according to the first embodiment shown in and described with reference to FIGS. 1 and 2, except that in this embodiment the right sealing member 7 is provided with an S-pole magnet 8S, which defines the to-be-detected member 8, and an N-pole magnet 8N spaced from the S-pole magnet 8S in a direction circumferentially of the rotatable and stationary raceway members 4 and 5. Those magnets 8S and 8N are specifically spaced 180° from each other about the longitudinal axis of, for example, the stationary raceway member 5. The direction of the magnetic flux required to switch the magnetic detecting member 9 (FIG. 1) off and the direction of the leakage magnetic flux may not be specifically limited.

Other structural features of the combined sensor and bearing assembly 1 according to the sixth embodiment than those described above are substantially similar to those shown in and described in connection with the first embodiment with reference to FIGS. 1 and 2 and, therefore, the details thereof are not reiterated for the sake of brevity.

According to the sixth embodiment, when the rotatable raceway member 4 rotates with no leakage magnetic field developed, the Hall IC used as the magnetic detecting member 9 provides such an output that as shown by the waveform (a) in FIG. 11, the Hall IC can be switched on only when the magnetic detecting member 9 moves past, i.e., detects the S-pole magnet 8S, and therefore, a normal waveform of one pulse for one complete rotation can be obtained.

Where the use is made under the environment in which the leakage magnetic flux with which the Hall IC can be switched on at all times is applied as described with reference to FIG. 4, it is possible to switch the Hall IC off, having overcome the leakage magnetic flux tending to switch the Hall IC on, when the N-pole magnet 8N then rotating together with the rotatable raceway member 4 approaches the Hall IC. As a result, such an output signal as shown by the waveform (b) in FIG. 11 can be obtained from the magnetic detecting member 9. Although the respective pulse widths of the waveforms (a) and (b) shown in FIG. 11 differ from each other, this difference can be negligible where the combined sensor and bearing assembly 1 is used for detection of the rotational speed of the rotatable raceway member 4 or for detection of the presence or absence of the revolution taking place. As described above, the use of the S-pole and N-pole magnets 8S and 8N for the to-be-detected member 8 is effective to accomplish the accurate detection of the point of origin without being adversely affected by the leakage magnetic flux.

The present invention having been fully described, it is to be noted that in the practice of any one of the previously described embodiments of the present invention, the magnetic sensor (for example, the Hall IC) used in the magnetic detecting member 9 may be in the form of a magnetic sensor of a type having a sensitivity so low that the leakage magnetic flux in the vicinity of the magnetic detecting member 9 can not be detected. Thus, selection of the magnetic sensor of the type having an operating magnetic flux intensity required for the magnetic detecting member 9 to be switched on, which is higher than the leakage magnetic flux, it is possible to prevent an erroneous operation in the presence of the leakage magnetic flux, allowing the magnetic detecting member 9 to be switched on only when the to-be-detected member 8 is brought to a position confronting the magnetic detecting member 9. In the case of this arrangement, the influence brought about by the leakage magnetic flux on the magnetic detecting member 9 can advantageously be minimized, regardless of the relation between the direction, in which the magnetic detecting member 9 detects the magnetic field, and the direction of the leakage magnetic flux.

Although the present invention has been fully described in connection with the referred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing any of the foregoing embodiments of the present invention the outer and inner races have been shown and described as represented by the rotatable and stationary raceway members 4 and 5, respectively, the present invention can be equally applied even where the rotatable and stationary raceway members 4 and 5 represent the inner and outer races, respectively.

Also, the combined sensor and bearing assembly of the present invention can be used not only in association with the electromagnetic clutch such as shown and described, but in the vicinity of any coil from which a leakage magnetic flux emanates such as, for example, a coil of an electric drive motor.

Accordingly, such changes and modifications are, unless they depart from the scope of the present invention as delivered from the claims annexed hereto, to be construed as included therein.

What is claimed is:

1. A combined sensor and bearing assembly, the assembly comprising:
   a rolling bearing unit made up of a rotatable raceway member, a stationary raceway member and at least one row of rolling elements rollingly interposed between the rotatable and stationary raceway members; and
   a rotation sensor unit including a to-be-detected member made up of a magnet fitted to one of the raceway members; and a magnetic detecting member fitted to the other raceway member at a location confronting the to-be-detected member,
   wherein the combined sensor and bearing assembly is used at a location close to an electric coil emanating a leakage magnetic field in a condition in which a direction of flow of an electric current through the coil is fixed in one direction; and
   the magnet of the to-be-detected member is made up of a first magnet of which an S-pole is to be detected, and a second magnet of which an N-pole is to be detected and spaced from the first magnet in a direction circumferentially of the rotatable and stationary raceway members.

* * * * *